(12) United States Patent
Koide et al.

(10) Patent No.: US 7,180,707 B2
(45) Date of Patent: Feb. 20, 2007

(54) THIN-FILM MAGNETIC HEAD, HEAD GIMBAL ASSEMBLY, AND HARD DISK DRIVE

(75) Inventors: Soji Koide, Chuo-ku (JP); Norikazu Ota, Chuo-ku (JP); Nobuya Oyama, Chuo-ku (JP); Tetsuro Sasaki, Chuo-ku (JP)

(73) Assignee: TDK Corporation, Tokyo (JP)

( * ) Notice: Subject to any disclaimer, the term of this patent is extended or adjusted under 35 U.S.C. 154(b) by 447 days.

(21) Appl. No.: 10/780,581

(22) Filed: Feb. 19, 2004

(65) Prior Publication Data

US 2004/0165312 A1   Aug. 26, 2004

(30) Foreign Application Priority Data

Feb. 25, 2003   (JP) .............................. 2003-047709

(51) Int. Cl.
G11B 5/39   (2006.01)
G11B 21/02  (2006.01)

(52) U.S. Cl. .......................... 360/128; 360/317; 360/75

(58) Field of Classification Search ................ 360/317, 360/75, 128, 122, 234.4, 294.7, 126
See application file for complete search history.

(56) References Cited

U.S. PATENT DOCUMENTS

| | | | |
|---|---|---|---|
| 5,872,684 A * | 2/1999 | Hadfield et al. | 360/235.4 |
| 5,991,113 A * | 11/1999 | Meyer et al. | 360/75 |
| 6,679,762 B2 * | 1/2004 | Fatula et al. | 451/53 |
| 6,876,509 B2 * | 4/2005 | Bonin et al. | 360/75 |
| 6,963,464 B2 * | 11/2005 | Xu et al. | 360/75 |
| 6,999,265 B1 * | 2/2006 | Schreck et al. | 360/75 |
| 7,046,473 B2 * | 5/2006 | Fu et al. | 360/75 |
| 7,061,706 B2 * | 6/2006 | Conteras et al. | 360/75 |
| 7,068,468 B2 * | 6/2006 | Kamijima | 360/128 |
| 2002/0141113 A1 * | 10/2002 | Kang et al. | 360/236.5 |
| 2003/0174430 A1 * | 9/2003 | Takahashi et al. | 360/75 |
| 2003/0184915 A1 * | 10/2003 | Kameyama et al. | 360/235.8 |
| 2004/0114268 A1 * | 6/2004 | Satoh et al. | 360/75 |
| 2004/0201920 A1 * | 10/2004 | Koide et al. | 360/128 |
| 2005/0254171 A1 * | 11/2005 | Ota et al. | 360/128 |
| 2005/0270694 A1 * | 12/2005 | Umehara et al. | 360/126 |
| 2006/0028754 A1 * | 2/2006 | Suk | 360/75 |
| 2006/0034013 A1 * | 2/2006 | Kato et al. | 360/128 |
| 2006/0034014 A1 * | 2/2006 | Kato et al. | 360/128 |
| 2006/0092570 A1 * | 5/2006 | Payne et al. | 360/236.5 |
| 2006/0103981 A1 * | 5/2006 | Kiyono et al. | 360/126 |

FOREIGN PATENT DOCUMENTS

| | | |
|---|---|---|
| JP | A 5-020635 | 1/1993 |
| JP | 2002343049 A * | 11/2002 |

* cited by examiner

*Primary Examiner*—William J Klimowicz
(74) *Attorney, Agent, or Firm*—Oliff & Berridge, PLC (57) ABSTRACT

A thin-film magnetic head on a support includes an electromagnetic transducer for writing, a magnetoresistive device for reading, an overcoat layer and a heating element. The transducer and magnetoresistive device are disposed on the support. The overcoat layer is disposed at the opposite side of them from the support. The heating element is provided in the overcoat layer and generates heat when energized.

10 Claims, 6 Drawing Sheets

THIN-FILM MAGNETIC HEAD, HEAD GIMBAL ASSEMBLY, AND HARD DISK DRIVE

BACKGROUND OF THE INVENTION

1. Field of the Invention

The present invention relates to a thin-film magnetic head, a head gimbal assembly, and a hard disk drive having an electromagnetic transducer and a magnetoresistive device.

2. Related Background Art

Thin-film magnetic heads with electromagnetic transducers for writing and magnetoresistive devices for reading have been configured so as to levitate from hard disks, which are recording media, when writing or reading data to or from hard disk drives. Specifically, a thin-film magnetic head is mounted to a gimbal, which is attached to a leading end of a suspension arm, to constitute a head gimbal assembly (HGA). As the hard disk rotates, air flows under the thin-film magnetic head, so as to flex the suspension arm, thereby levitating the head.

The gap between the thin-film magnetic head and the hard disk, i.e., the head levitation amount, has been decreasing from 20 nm to 15 nm, and further to 10 nm as the hard disk has been attaining a higher recording density. A technique for reducing the head levitation amount is disclosed in Japanese Patent Application Laid-Open No. HEI 5-20635.

SUMMARY OF THE INVENTION

For attaining a higher recording density, the distance between the electromagnetic transducer or the magnetoresistive device in the thin-film magnetic head and the recording medium is required to be shorter.

It is an object of the present invention to provide a thin-film magnetic head, a head gimbal assembly and a hard disk drive for reducing the distance between the electromagnetic transducer or the magnetoresistive device in the thin-film magnetic head and a recording medium.

In one aspect, the present invention relates to a thin-film magnetic head provided on a support. The head comprises an electromagnetic transducer for writing and a magnetoresistive device for reading which are disposed on the support, an overcoat layer disposed on the electromagnetic transducer and the magnetoresistive device on a side away from the support, and a heating element provided in the overcoat layer. The heating element generates heat when energized.

The electromagnetic transducer may be disposed between the overcoat layer and the magnetoresistive device.

The electromagnetic transducer may overlie the magnetoresistive device on the support. The overcoat layer may cover the electromagnetic transducer. The heating element may be located farther from the support than the electromagnetic transducer.

The thin-film magnetic head may further comprise a facing surface to oppose a recording medium. The electromagnetic transducer and the magnetoresistive device may be exposed on the facing surface. The heating element may be separated from the facing surface. The heating element may extend substantially perpendicularly to the facing surface. The heating element may be placed so as to cause at least either of the electromagnetic transducer and the magnetoresistive device to approach the recording medium when energized.

In another aspect, the present invention relates to a head gimbal assembly. The head gimbal assembly comprises a support, a thin-film magnetic head provided on the support, and a gimbal for securing the support. The thin-film magnetic head has an electromagnetic transducer for writing and a magnetoresistive device for reading which are disposed on the support, an overcoat layer disposed on the electromagnetic transducer and the magnetoresistive device on a side away from the support, and a heating element provided in the overcoat layer. The heating element generates heat when energized.

In further aspect, the present invention relates to a hard disk drive. The hard disk drive comprises a support, a thin-film magnetic head provided on the support, and a recording medium facing the thin-film magnetic head. The thin-film magnetic head has an electromagnetic transducer for writing and a magnetoresistive device for reading which are disposed on the support, an overcoat layer disposed on the electromagnetic transducer and the magnetoresistive device on a side away from the support, and a heating element provided in the overcoat layer. The heating element generates heat when energized.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

The preferred embodiments of the present invention will be described below in greater detail with reference to the accompanying drawings. To facilitate understanding, identical reference numerals are used, where possible, to designate identical or equivalent elements that are common to the drawings, and these elements will not be explained repeatedly.

Figure 1:
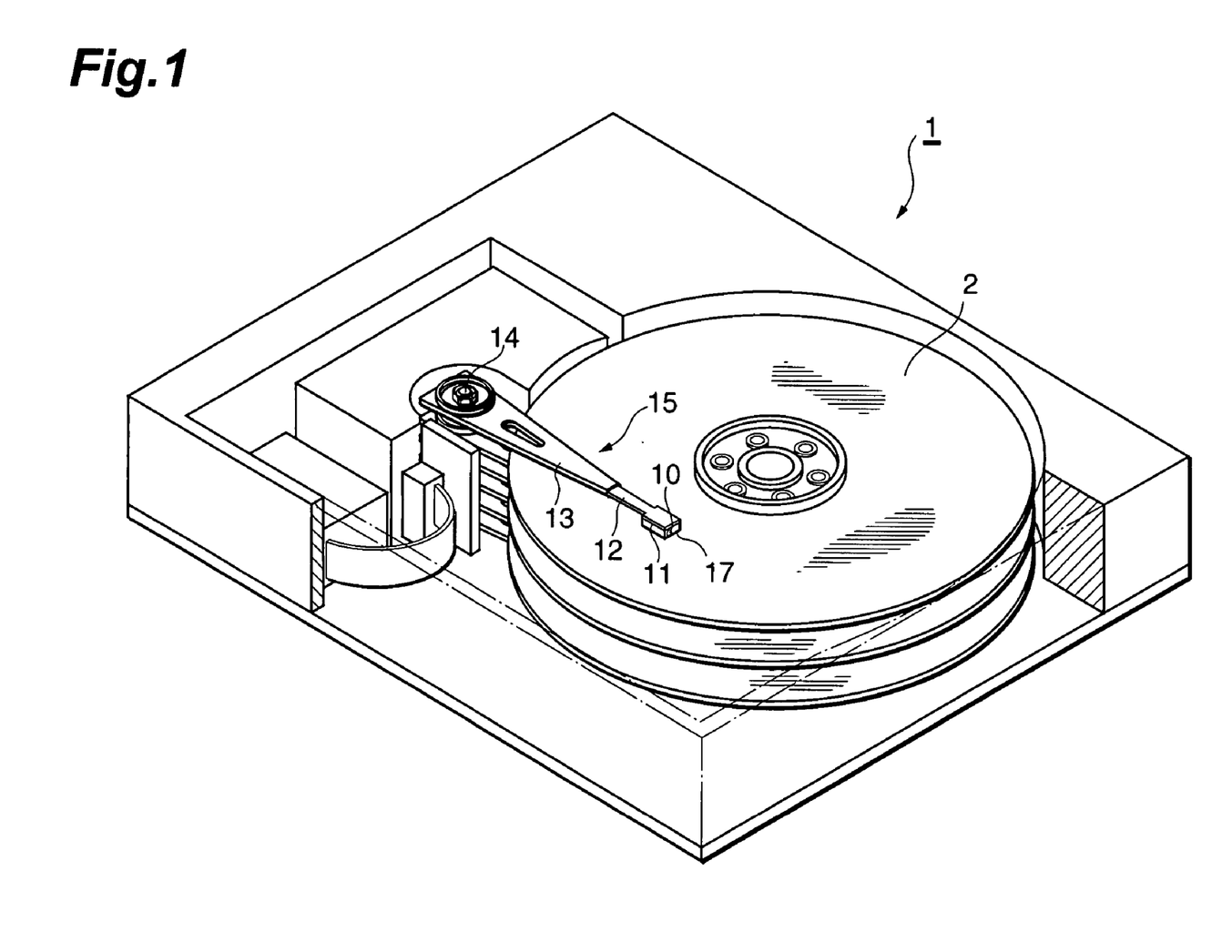
FIG. 1 is a perspective view showing a hard disk drive.

FIG. 1 is a view showing a hard disk drive with a thin-film magnetic head in accordance with this embodiment. The hard disk drive 1 is adapted to actuate a head gimbal assembly (HGA) 15 so that a thin-film magnetic head 10 records/reproduces magnetic information onto/from a recording surface (the upper face in FIG. 1) of a hard disk (i.e., recording medium) 2 rotating at high speed. The head gimbal assembly 15 has a gimbal 12 holding a head slider 11 on which the thin-film magnetic head 10 is provided, and a suspension arm 13 connected to the gimbal 12. The head gimbal assembly 15 is rotatable about a shaft 14, by a voice coil motor, for example. As the head gimbal assembly 15 rotates, the head slider 11 moves radially, that is, in the directions traversing track lines of the hard disk 2.

Figure 2:
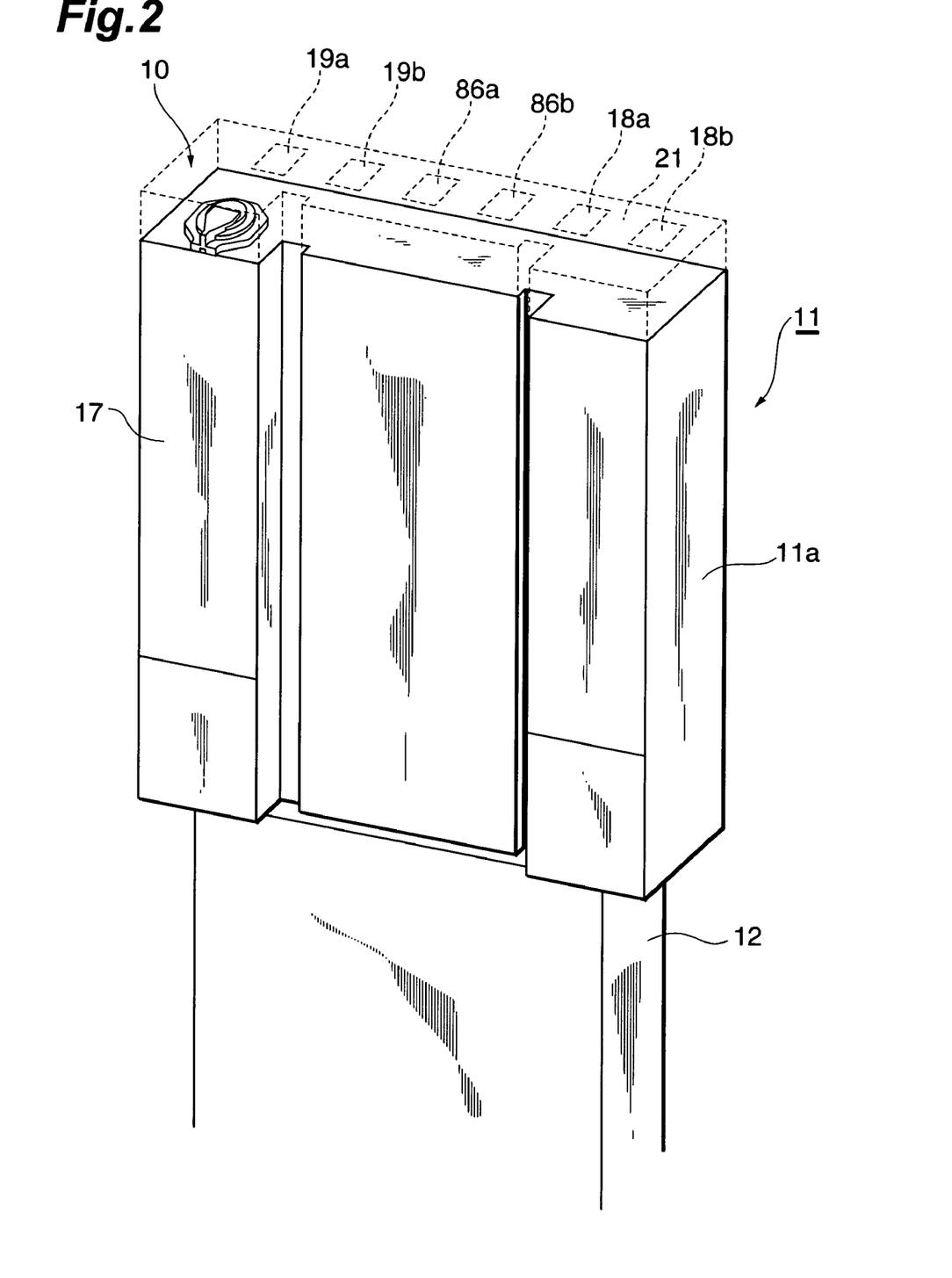
FIG. 2 is a perspective view showing a head slider.

FIG. 2 is an enlarged perspective view showing the head slider 11. The head slider 11 has a support 11a with substantially rectangular parallelepiped shape mainly composed of AlTiC (Al$_2$O$_3$—TiC), and the thin-film magnetic head 10 is provided on the support 11a. The front-side face of the head slider 11 in the drawing is a facing surface to oppose a recording surface of the hard disk 2, and is referred to as an air bearing surface (ABS) 17. When the hard disk 2 rotates, the airflows caused by the rotation levitates the head slider 11, whereby the air bearing surface 17 moves away from the recording surface of the hard disk 2. The thin-film magnetic head 10 is provided with an overcoat layer 21 indicated by the broken lines in the drawing (which will be explained later in detail) to protect the head 10. Attached onto the overcoat layer 21 are recording pads 18a and 18b, reproducing pads 19a and 19b, and heater pads 86a and 86b which will be explained later. Attached to the suspension arm 13 shown in FIG. 1 are leads (not depicted), connected to the respective pads, for input/output of electric signals. The air bearing surface 17 may be coated with DLC (Diamond-Like Carbon) or the like.

Figure 3:
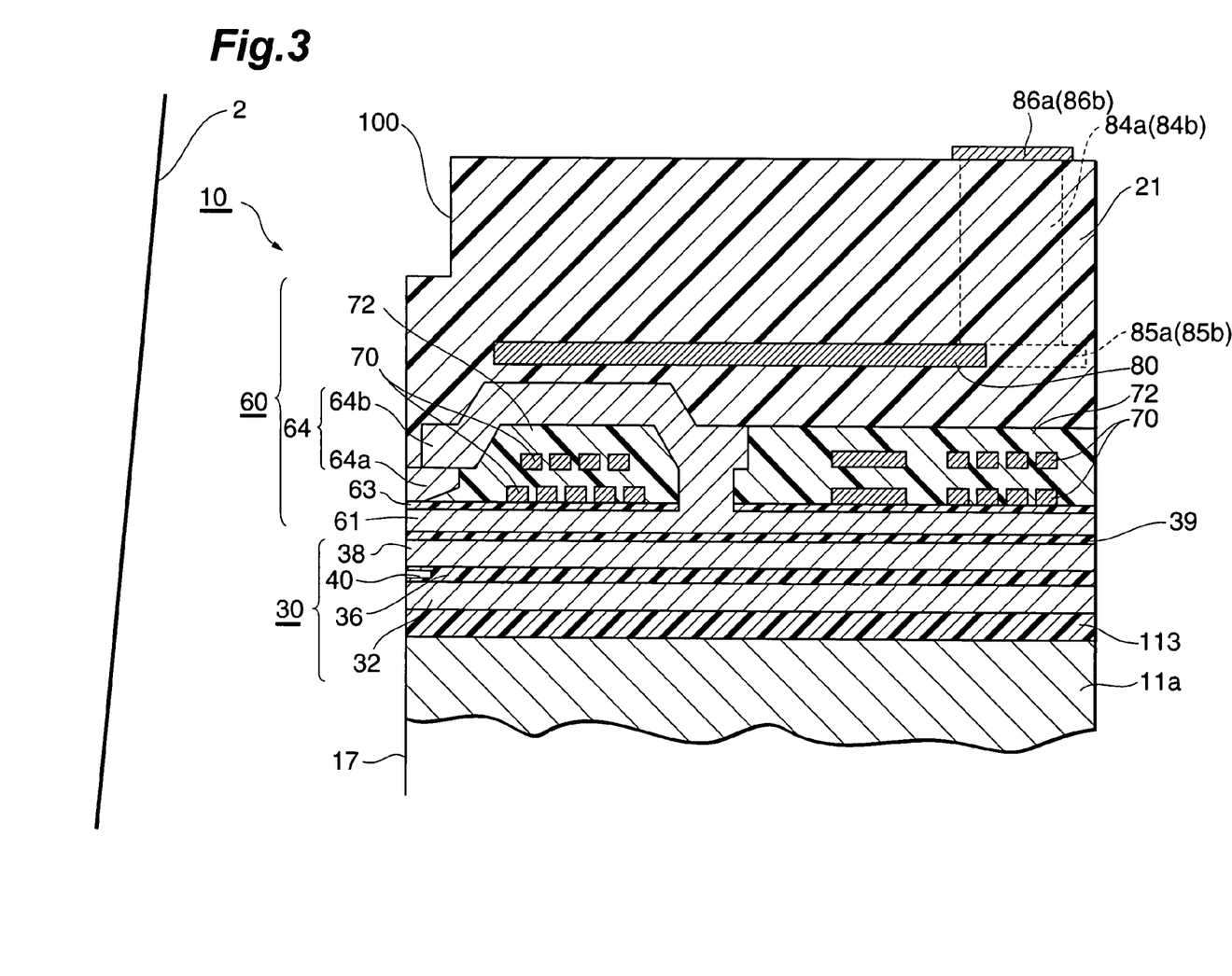
FIG. 3 is a sectional view showing a thin-film magnetic head.

FIG. 3 is a sectional view of the thin-film magnetic head 10 taken perpendicularly to the air bearing surface 17. The thin-film magnetic head 10 is a combination head mainly composed of a reproducing head part 30, a recording head part 60 and the overcoat layer 21 which are successively provided on the support 11a in the order written. The reproducing head part 30 includes a GMR (Giant MagnetoResistive) device 40. The recording head part 60 is an inductive electromagnetic transducer. The overcoat layer 21 covers the recording head part 60.

The support 11a is a wafer-like substrate made of AlTiC (Al$_2$O$_3$—TiC) or the like. On the support 11a, an undercoat layer 113 made of electrically insulating material such as alumina is formed with a thickness of about 1 μm to about 10 μm.

The reproducing head part 30 is disposed on the undercoat layer 113 and has a lower shield layer 32, an electrically insulating layer 36 holding the GMR device 40 from its upper and lower sides, and an upper shield layer 38, which are laminated on the undercoat layer 113 in the order written. The GMR device 40 is a device utilizing a giant magnetoresistive effect with a high magnetoresistance change ratio. The GMR device 40 has a multilayer structure (not depicted) and is exposed on the ABS 17. Each of the lower shield layer 32 and upper shield layer 38 contains magnetic material and acts to prevent the GMR device 40 from sensing unnecessary external magnetic fields. The lower shield layer 32 has a thickness of about 1 μm to about 3 μm, and the upper shield layer 38 has a thickness of about 1 μm to about 4 μm. The insulating layer 36 has a thickness of about 0.05 μm to about 1.0 μm. Words "lower" and "upper" used in the specification, as in the case of shield layers, refer to respective sides closer to and farther from the support 11a.

The recording head part 60 is a longitudinal recording type of inductive electromagnetic transducer, which is formed on the reproducing head part 30 with an electrically insulating layer 39 therebetween. The recording head part 60 is exposed on the ABS 17. Alumina or the like with a thickness of about 0.1 μm to about 2.0 μm can be used as the insulating layer 39, though the layer 39 is not always necessary. The recording head part 60 has a lower magnetic pole 61 made of soft magnetic material and a gap layer 63 made of nonmagnetic electrically insulating material, which are provided successively on the insulating layer 39 in the order written. Laminated on the gap layer 63 are a magnetic pole part layer 64a on the ABS 17 side and an electrically insulating layer 72 on the side away from the ABS 17. Two stages, i.e., upper and lower stages, of thin-film coils 70 are embedded in the insulating layer 72. A yoke part layer 64b is provided on the magnetic pole part layer 64a and the insulating layer 72. The magnetic pole part layer 64a and the yoke part layer 64b constitute an upper magnetic pole 64. Some of the thin-film coils 70 are sandwiched between the yoke part layer 64b and the lower magnetic pole 61. The yoke part layer 64b magnetically connects with the lower magnetic pole 61 on the side away from the ABS 17. The lower magnetic pole 61, gap layer 63, thin-film coils 70, insulating layer 72, and upper magnetic pole 64 constitute the recording head part 60.

The lower magnetic pole 61 is made of magnetic material such as permalloy (NiFe), and has a thickness of about 1 μm to about 3 μm, for example.

The gap layer 63 is a nonmagnetic electrical insulator such as alumina (Al$_2$O$_3$) or a combination of a nonmagnetic electrical conductor and a nonmagnetic electrical insulator, and has a thickness of about 0.05 μm to about 0.5 μm, for example.

The magnetic pole part layer 64a may be made of permalloy (NiFe) or other material such as (1) one containing iron and nitrogen atoms, (2) one containing iron, zirconia and oxygen atoms, or (3) one containing iron and nickel elements. The thickness of the magnetic pole part layer 64a is about 0.5 μm to about 3.5 μm, for example, and preferably 1.0 μm to 2.0 μm.

The yoke part layer 64b is made of the same material as that for the magnetic pole part layer 64a, and has a thickness of about 1 μm to about 5 μm, for example.

The thin-film coils 70 are made of electrically conductive material such as Cu, and each of the coils 70 has a thickness of about 1 μm to about 3 μm, for example.

The insulating layer 72 is made of electrically insulating material such as alumina or resist, and has a thickness of about 0.1 μm to about 3 μm, for example.

When a recording current is fed through the thin-film coils 70, a magnetic flux occurs between the magnetic pole part layer 64a and the lower magnetic pole 61, whereby information can be recorded on a recording medium such as hard disk.

The overcoat layer 21 is for protecting the recording head part 60 of the thin-film magnetic head 10, and is made of electrically insulating material such as alumina. The overcoat layer 21 is disposed on the recording head part 60 and the GMR device 40 on the side away from the support 11a. The overcoat layer 21 is formed on the recording head part 60 with a thickness of about 5.0 μm to about 30 μm. In the overcoat layer 21, a cutout 100 is formed at an edge defined by the ABS 17 and the upper face of the layer 21 farthest from the support 11a.

In this embodiment, a heating layer (heating element) 80 made of Cu, Ni, Fe, Ta, Ti, CoNiFe alloy, FeAlSi alloy or the like is disposed in the overcoat layer 21. In the overcoat layer 21, the heating layer 80 is formed in parallel with the upper shield layer 38 and the like while being separated from the ABS 17 by a predetermined distance.

Electrically conductive members 84a and 84b are connected to the heating layer 80 and extends upward in the drawing. The conductive members 84a and 84b are made of electrically conductive material such as Cu. The heater pads 86a and 86b are attached to the upper ends of the conductive members 84a and 84b, respectively. Similarly, though not depicted in FIG. 3 for simplification, the recording head part 60 is connected to the recording pads 18a and 18b (see FIG.

2), and the magnetoresistive device 40 in the reproducing head part 30 is connected to the reproducing pads 19a and 19b.

Figure 4:
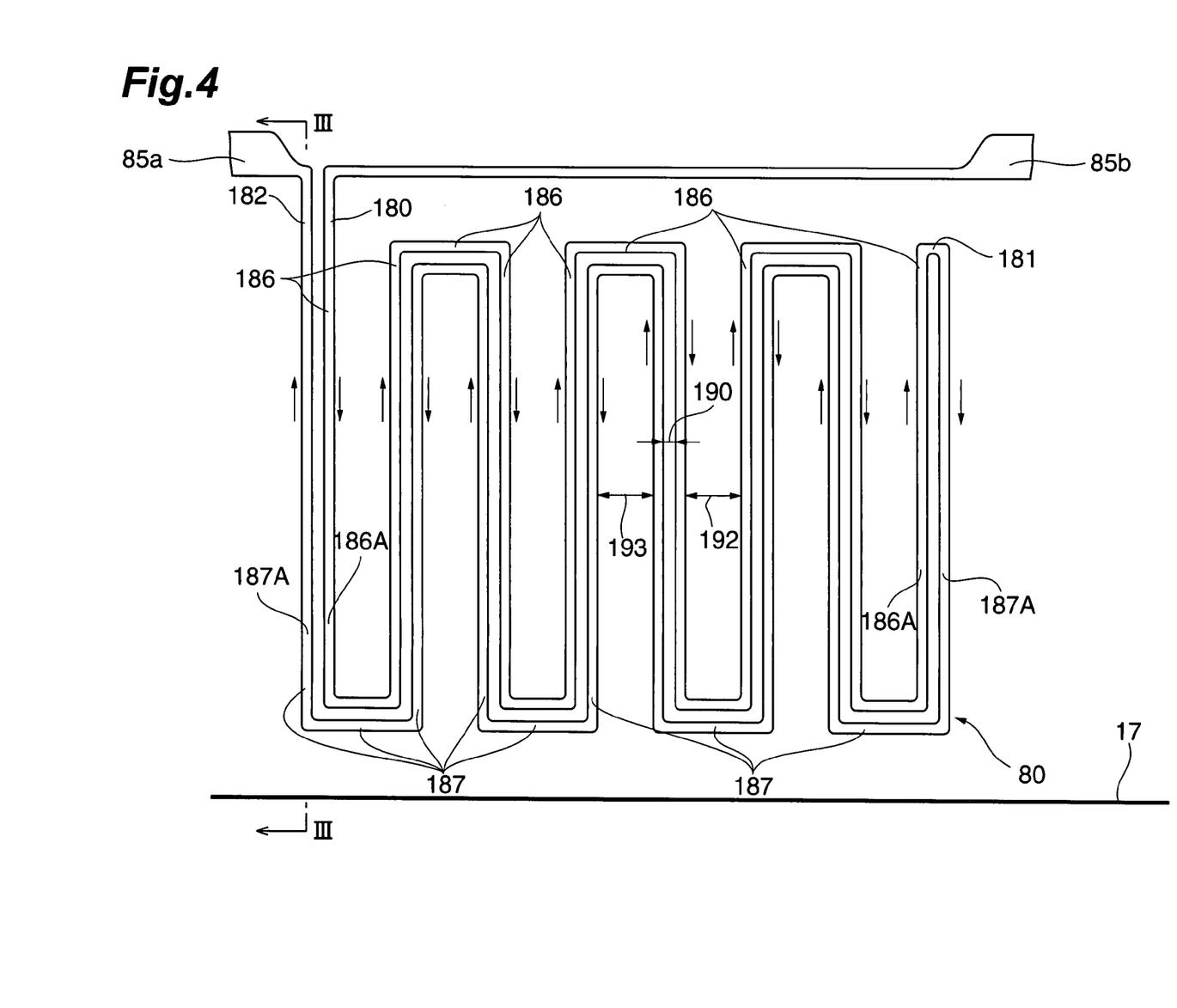
FIG. 4 is a plan view showing a heating layer in the thin-film magnetic head.

FIG. 4 is a plan view showing an example of the heating layer 80. The III—III section of the heating layer 80 in FIG. 4 corresponds to the cross section of the heating layer 80 shown in FIG. 3. The air bearing surface (ABS) 17 extends horizontally in FIG. 4 and perpendicularly to the paper surface of FIG. 4, and is located lower than the heating layer 80 in FIG. 4. The heating layer 80 has a configuration in which a single strip is wound repeatedly and extraction electrodes 85a and 85b are provided at the both ends of the strip, respectively. The extraction electrodes 85a and 85b are connected to the electrically conductive members 84a and 84b shown in FIG. 3, respectively.

More specifically, the heating layer 80 has a initial part 186 travelling from a start point 180 to a turning point 181 while winding in a pattern like a rectangular wave, and a latter part 187 doubling back from the turning point 181 to an end point 182 near the start point 180 while following a path substantially parallel to the initial part 186. The gap 190 between the initial part 186 and the latter part 187 extending adjacent to each other is narrower than the gap 192 between the rising and falling portions of the wave cycle of the initial part 186 or the gap 193 between the rising and falling portions of the wave cycle of the latter part 187.

The heating layer 80 extends farther in the direction substantially perpendicular to the ABS 17 than it does in the direction substantially parallel to the ABS 17.

Figure 5:
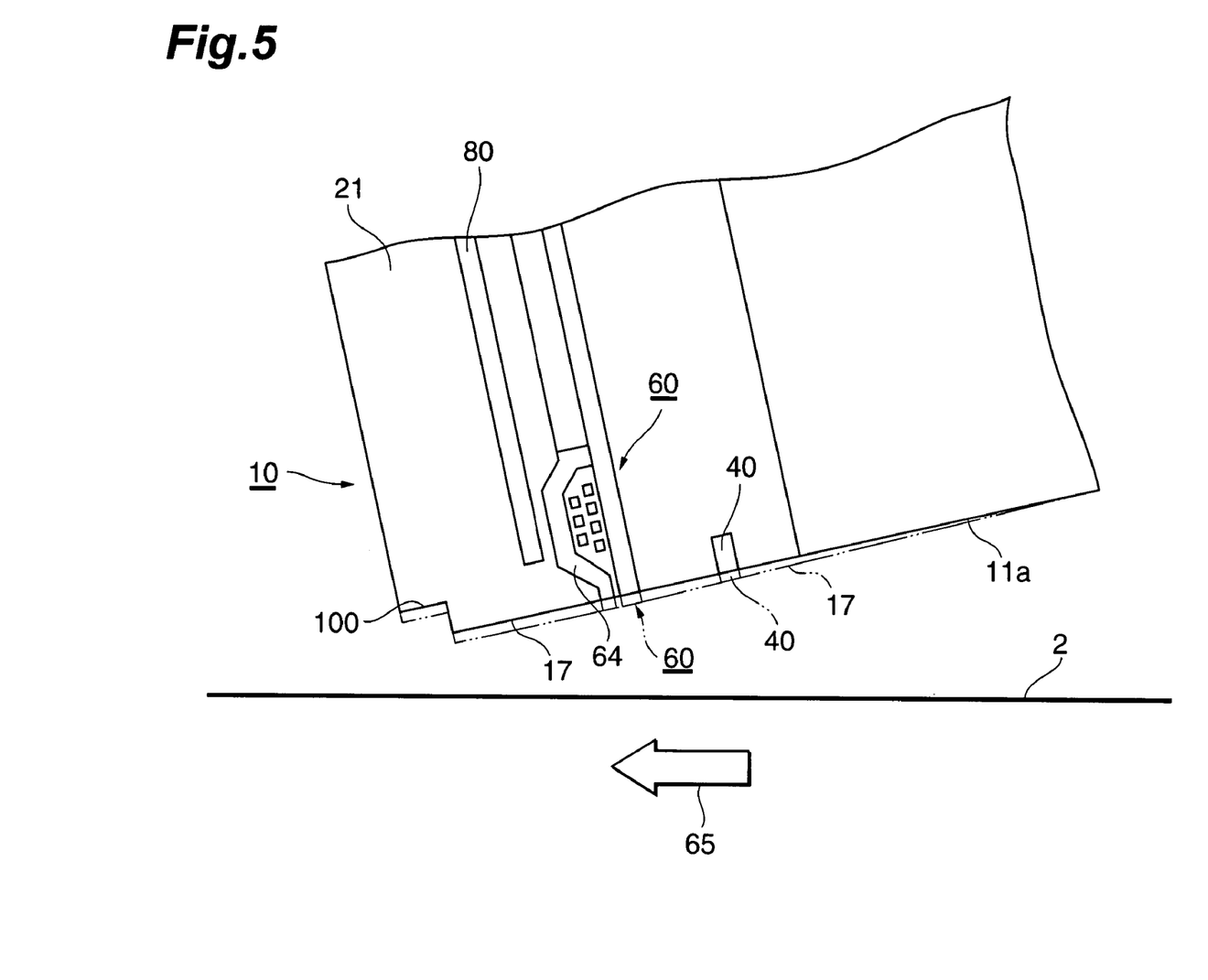
FIG. 5 is a schematic view showing thermal expansion of the thin-film magnetic head.

Operations of the thin-film magnetic head 10, head gimbal assembly 15, and hard disk drive 1 will now be described. When the hard disk 2 rotates in the direction of the arrow 65 in FIG. 5, the thin-film magnetic head 10 levitates because of the airflow, whereby the recording head part 60 tilts forward (attains a forward tilting posture) so that its upper magnetic pole 64 side approaches the hard disk 2. When the heating layer 80 is energized in this situation, the portion of the thin-film magnetic head 10 surrounding the heating layer 80 is thermally expanded by the heat generated from the heating layer 80, whereby the ABS 17 of the thin-film magnetic head 10 and support 11a projects toward the recording medium 2 as indicated by dash-double-dot lines in FIG. 5. This reduces the gap between the hard disk 2 and the GMR device 40 and the recording head part 60, thereby yielding a higher reproducing output and a higher recording density. Regulating the amount of current fed through the heating layer 80 can adjust the amount of the projection, thereby making it possible to control the distance between the recording medium 2 and the recording head part 60 or the GMR device 40.

Since the heating layer 80 is provided in the overcoat layer 21 while the recording head part 60 is disposed between the overcoat layer 21 and the GMR device 40, the gap between the GMR device 40 and the heating layer 80 is wider than the gap between the recording head part 60 and the heating layer 80. Therefore, the GMR device 40, which is relatively susceptible to heat, can become less likely to be adversely affected by a high temperature, thereby improving the reliability of the thin-film magnetic head 10.

The heating layer 80 extends farther in the direction substantially perpendicular to the ABS 17 than it does in the direction substantially parallel to the ABS 17. Therefore, the heating layer 80 itself easily expands perpendicularly to the ABS 17 when energized. Accordingly, the GMR device 40 and the recording head part 60 can efficiently project toward the recording medium 2.

Since the overcoat layer 21 in the thin-film magnetic head 10 is provided with the cutout 100, the ABS 17 of the thin-film magnetic head 10 is less likely to come into contact with the recording medium 2 even when projected toward the hard disk 2 upon the thermal expansion. For the shape of the cutout 100, it is not limited to a single-stage cutout as in this embodiment, and may be a multistage cutout, a sloped cutout, and the like.

In the heating layer 80, the initial part 186 and the latter part 187 wind along each other as shown in FIG. 4, so that magnetic fields generated from these parts 186 and 187 between the start and end points 180 and 182 and the turning point 181 cancel out each other as can be seen from Ampere's corkscrew rule. Therefore, the magnetic field leakage decreases and becomes less likely to adversely affect the recording head part 60 and the magnetoresistive device 40. Since the gap 190 is narrower than the gap 192 or 193, a portion of the initial part 186 and a portion of the latter part 187 which are disposed close to each other are less likely to be influenced by the magnetic fields generated from other distanced portions of the parts 186 and 187. This enables the magnetic fields caused by energizing the heating layer 80 to be cancelled out each other more favorably. Hence, the magnetic field leakage from portions 186A of the initial part 186 and portions 187A of the latter part 187 disposed so as to extend along each other on the outermost sides of the heating layer 80 is reduced in particular.

As explained in the foregoing, this embodiment provides the thin-film magnetic head 10, head gimbal assembly 15, and hard disk drive 1 which can reduce the distance from the hard disk 2 and attain recording with a higher density.

An example of method of manufacturing the thin-film magnetic head 10 will now be described. In the following, explanations of known manufacturing steps will be simplified.

Figure 6:
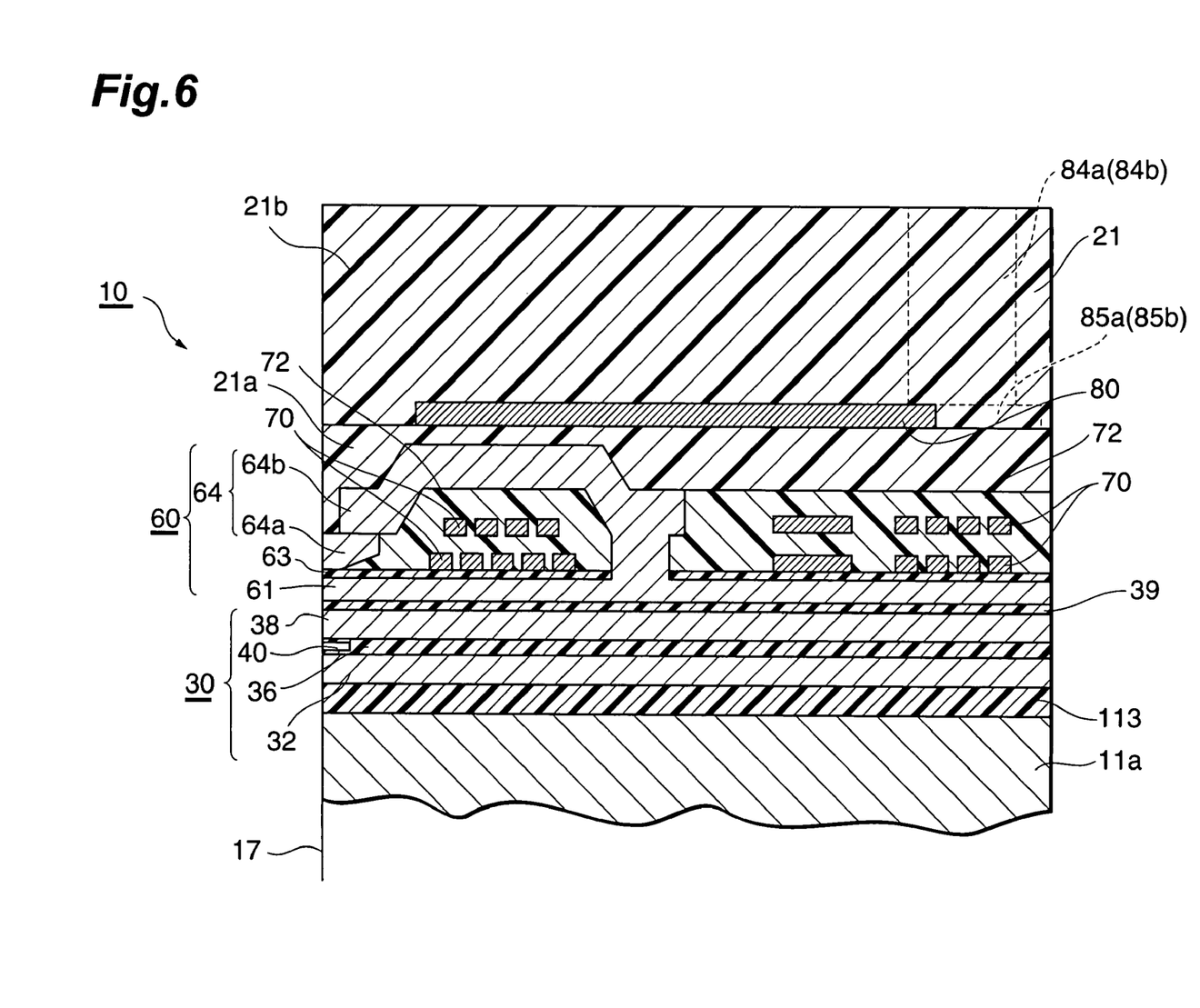
FIG. 6 is a view showing a method of manufacturing the thin-film magnetic head.

First, as shown in FIG. 6, the undercoat layer 113 made of electrically insulating material such as alumina ($Al_2O_3$) is formed, for example, by sputtering, on the support 11a which is a substrate made of AlTiC ($Al_2O_3$—TiC) or the like.

Subsequently, on the undercoat layer 113, the lower shield layer 32 made of magnetic material such as permalloy is formed, for example, by plating. Further, on the lower shield layer 32, the GMR device 40 and the electrically insulating layer 36, made of $Al_2O_3$ or the like, holding the GMR device 40 in its inside are formed using known techniques. The GMR device 40 includes a plurality of films in practice, but is depicted as a single layer in FIG. 6 for simplicity of the drawing. The GMR device 40 is formed on the ABS side of the thin-film magnetic head 10. Subsequently, on the insulating layer 36, the upper shield layer 38 is formed, for example, by plating. The reproducing head part 30 is provided in this way.

Next, on the upper shield layer 38, the electrically insulating layer 39 made of electrically insulating material such as $Al_2O_3$ is formed, for example, by sputtering.

Subsequently, on the insulating layer 39, the lower magnetic pole 61 made of permalloy is formed, for example, by sputtering. Then, on the lower magnetic pole 61, the gap layer 63 made of a nonmagnetic electrical insulator or a combination of a nonmagnetic electrical conductor and a nonmagnetic electrical insulator is formed, for example, by sputtering. Further, on the gap layer 63, the electrically insulating layer 72 with the two stages of thin-film coils 70 in its inside, and the magnetic pole part layer 64a and the yoke part layer 64b of the upper magnetic pole 64 are formed by a known method using photolithography, dry etching, or the like. These components are formed so that some of the thin-film coils 70 are held between the lower magnetic pole 61 and the upper magnetic pole 64. Though the two stages of the thin-film coils 70 are formed in this embodiment, the number of the stages is not limited thereto, and helical coils or the like may be formed instead of the thin film coils. The recording head part 60 is provided in this way.

Next, a nonmagnetic lower overcoat layer 21a is formed so as to cover the recording head part 60. Then, on the lower overcoat layer 21a, the heating layer 80 made of electrically conductive material such as Cu, NiFe, Ta, Ti, CoNiFe alloy, and FeAlSi alloy is formed by sputtering.

Forming the heating layers 80 by sputtering can reduce the variation in the thicknesses of the different thin-film magnetic heads, thereby decreasing the variation in their electrical resistances. For example, when NiFe heating layers 80 were made by plating, the standard deviation of the resistance of the heating layers was 11.6Ω. When 7931 NiFe heating layers 80 were formed by sputtering, on the other hand, the standard deviation of the resistance of the heating layers was 4.66Ω. However, the heating layer 80 may be formed by plating.

Subsequently, on the extraction electrodes 85a and 85b of the heating layer 80, the electrically conductive members 84a and 84b are formed, for example, by plating, and then electrically insulating material such as Al$_2$O$_3$ is laminated thereon as an upper layer, for example, by sputtering. The height of the insulating material is adjusted, for example, by polishing, thereby obtaining an upper overcoat layer 21b. The lower overcoat layer 21a and the upper overcoat layer 21b constitute the overcoat layer 21. Thereafter, the heater pads 86a and 86b are formed at the upper ends of the electrically conductive members 84a and 84b, respectively. Though not depicted, the recording pads and the reproducing pads are also formed at that time. Further, an edge of the overcoat layer 21 is shaved so as to form the cutout 100.

The thin-film magnetic head 10 of this embodiment is completed in this way.

As described above, the heating layer 80 can be produced in the step forming the overcoat layer 21 which is relatively simple and carried out after the relatively complicated steps forming the reproducing head part 30 and recording head part 60. Consequently, the thin-film magnetic head 10 can be made at a lower cost than in the case where a heating element is provided at the position lower than or flush with the reproducing head part 30 or the recording head part 60 from the support 11a.

Thereafter, a slider rail is formed on the support 11a by ion milling or the like, whereby the head slider 11 shown in FIG. 2 is obtained. Then the head slider 11 is mounted to the gimbal 12, and the gimbal 12 is connected to the suspension arm 13, whereby the head gimbal assembly 15 shown in FIG. 1 is completed. Thereafter the head gimbal assembly 15 is assembled so that the head slider 11 is movable above the hard disk 2 so as to enable recording and reproducing magnetic signals to and from the hard disk 2. The hard disk drive 1 shown in FIG. 1 is completed in this way.

Though the present invention has been explained in detail with reference to the above embodiment, the invention should not be limited to this embodiment.

For example, the heating layer 80 may be provided at any positions as long as it is located within the overcoat layer 21. Also, two or more heating layers 80 may be provided. The distance between the heating layer 80 and the ABS 17 may be optionally determined. The heating layer 80 extends farther in the direction substantially perpendicular to the ABS 17 than it does in the direction substantially parallel to the ABS 17 in the above embodiment; however, configurations not satisfying this condition may be adopted, such as the configuration in which the ABS 17 extends vertically in FIG. 4 and perpendicularly to the paper surface of FIG. 4 so as to be located on the left side of the heating layer 80 in FIG. 4. The form of the heating layer 80 is not limited to the one in the above embodiment, either.

Depending on the amount of the current fed through the heating layer 80 or the like, the heating layer 80 may be covered with a shield layer containing soft magnetic material. This can prevent magnetic field leakage from the heating layer 80, if any, from adversely affecting the recording head part 60 and reproducing head part 30.

In the reproducing head part 30, MR devices such as CPP (Current Perpendicular to Plane)-GMR devices, AMR (Anisotropic MagnetoResistive) devices utilizing anisotropic magnetoresistive effect, and TMR (Tunneling MagnetoResistive) devices utilizing magnetoresistive effect occurring at tunneling junctions may also be utilized in place of the above-mentioned GMR device 40. The thin-film magnetic head may be of perpendicular recording type instead of longitudinal recording type.

Though, in FIG. 2, the thin-film magnetic head 10 including the recording head part 60 and GMR device 40 is disposed at one end of the leading end portion of the slider 11 in a track width direction orthogonal to the track lines, it may be disposed at the opposite end or at the center in the track width direction as long as the thin-film magnetic head 10 is located in the slider 11 at a position facing the ABS 17.

Though the heater pads 86a and 86b are disposed between the recording pads 18a and 18b and the reproducing pads 19a and 19b as shown in FIG. 2, any alternative arrangements are possible.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A thin-film magnetic head provided on a support, the thin-film magnetic head comprising:
    an electromagnetic transducer for writing and a magnetoresistive device for reading which are disposed on the support;
    an overcoat layer disposed on the electromagnetic transducer and the magnetoresistive device on a side away from the support;
    a facing surface to oppose a recording medium, the electromagnetic transducer and the magnetoresistive device being exposed on the facing surface; and
    a heating element provided in the overcoat layer, the heating element generating heat when energized, and a portion substantially perpendicular to the facing surface being greater in total length than the total length of a portion substantially parallel to the facing surface, wherein
        the heating element being a single strip wound repeatedly from an initial point to a turning point, and returning substantially to the initial point, in a substantially parallel path.

2. A thin-film magnetic head according to claim 1, wherein the electromagnetic transducer is disposed between the overcoat layer and the magnetoresistive device.

3. A thin-film magnetic head according to claim 1, wherein the electromagnetic transducer overlies the magnetoresistive device on the support,
wherein the overcoat layer covers the electromagnetic transducer, and
wherein the heating element is located farther from the support than the electromagnetic transducer.

4. A thin-film magnetic head according to claim 1, wherein the heating element is separated from the facing surface.

5. A thin-film magnetic head according to claim 1, wherein the heating element is placed so as to cause at least either of the electromagnetic transducer and the magnetoresistive device to approach the recording medium when energized.

6. A thin-film magnetic head according to claim 1, wherein the heating element having:
a first portion meandering between a first point and a halfway point; and
a second portion connected to the first portion, and meandering in the direction opposite to and along the first portion from the halfway point to a second point positioned in the vicinity of the first point.

7. A head gimbal assembly comprising:
a support;
a thin-film magnetic head provided on the support; and
a gimbal for securing the support,
the thin-film magnetic head having:
an electromagnetic transducer for writing and a magnetoresistive device for reading which are disposed on the support;
an overcoat layer disposed at an opposite side of the electromagnetic transducer and the magnetoresistive device from the support;
a facing surface to oppose a recording medium, the electromagnetic transducer and the magnetoresistive device being exposed on the facing surface; and
a heating element provided in the overcoat layer, the heating element generating heat when energized, and a portion substantially perpendicular to the facing surface being greater in total length than the total length of a portion substantially parallel to the facing surface, wherein
the heating element being a single strip wound repeatedly from an initial point to a turning point, and returning substantially to the initial point, in a substantially parallel path.

8. A head gimbal assembly according to claim 7, the heating element having:
a first portion meandering between a first point and a halfway point; and
a second portion connected to the first portion, and meandering in the direction opposite to and along the first portion from the halfway point to a second point positioned in the vicinity of the first point.

9. A hard disk drive comprising:
a support;
a thin-film magnetic head provided on the support; and
a recording medium facing the thin-film magnetic head,
the thin-film magnetic head having:
an electromagnetic transducer for writing and a magnetoresistive device for reading which are disposed on the support;
an overcoat layer disposed at an opposite side of the electromagnetic transducer and the magnetoresistive device from the support;
a facing surface to oppose a recording medium, the electromagnetic transducer and the magnetoresistive device being exposed on the facing surface; and
a heating element provided in the overcoat layer, the heating element generating heat when energized, and a portion substantially perpendicular to the facing surface being greater in total length than the total length of a portion substantially parallel to the facing surface, wherein
the heating element being a single strip wound repeatedly from an initial point to a turning point, and returning substantially to the initial point, in a substantially parallel path.

10. A hard disk drive according to claim 9, the heating element having:
a first portion meandering between a first point and a halfway point; and
a second portion connected to the first portion, and meandering in the direction opposite to and along the first portion from the halfway point to a second point positioned in the vicinity of the first point.

* * * * *